(12) United States Patent
Nagata et al.

(10) Patent No.: US 9,698,712 B2
(45) Date of Patent: Jul. 4, 2017

(54) INVERTER APPARATUS

(71) Applicant: KABUSHIKI KAISHA TOYOTA JIDOSHOKKI, Kariya-shi, Aichi-ken (JP)

(72) Inventors: Yoshiki Nagata, Kariya (JP); Takashi Kawashima, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 35 days.

(21) Appl. No.: 14/812,714

(22) Filed: Jul. 29, 2015

(65) Prior Publication Data

US 2016/0036359 A1    Feb. 4, 2016

(30) Foreign Application Priority Data

Jul. 30, 2014    (JP) ................... 2014-155354

(51) Int. Cl.
| | |
|---|---|
| *H02P 6/00* | (2016.01) |
| *H02P 6/14* | (2016.01) |
| *H02P 29/68* | (2016.01) |
| *H02P 29/62* | (2016.01) |
| *H02P 29/032* | (2016.01) |

(52) U.S. Cl.
CPC ............ *H02P 6/142* (2013.01); *H02P 29/032* (2016.02); *H02P 29/62* (2016.02); *H02P 29/68* (2016.02)

(58) Field of Classification Search
CPC .... H02P 6/14; H02P 6/08; H02P 6/182; H02P 6/085; H02P 27/08; H02P 2207/01; H02P 23/08; H02M 7/53875

USPC ............... 318/400.01, 811, 599, 801, 798
See application file for complete search history.

(56) References Cited

U.S. PATENT DOCUMENTS

| | | | | |
|---|---|---|---|---|
| 7,928,675 B2* | 4/2011 | Chen | ................. | B60L 15/025 318/400.02 |
| 8,102,141 B2* | 1/2012 | Nagai | ................. | H02P 1/426 318/727 |
| 2004/0232862 A1* | 11/2004 | Wogari | ................. | H02P 21/18 318/400.02 |
| 2007/0194746 A1* | 8/2007 | Yoshimoto | ....... | B60L 11/1881 318/801 |
| 2008/0042606 A1* | 2/2008 | Chen | ................. | B60L 15/025 318/474 |

FOREIGN PATENT DOCUMENTS

JP    06-038543 A    2/1994

* cited by examiner

*Primary Examiner* — Rina Duda
(74) *Attorney, Agent, or Firm* — Sughrue Mion, PLLC (57) ABSTRACT

An inverter apparatus includes an inverter circuit, a capacitor, and a control unit. In the first control mode, the control unit shifts a phase of at least one of PWM signals of three phases such that a time period during which polarities of output voltages of three phases are the same is shorter in the first control mode than the time period in the second control mode; and controls the inverter circuit so as to supply a direct current to the three-phase AC motor as a d-axis current by outputting the PWM signals of three phases, each having a phase after the phase shift processing. In the second control mode, the control unit controls the inverter circuit so as to supply an alternating current to the three-phase AC motor by outputting the PWM signals of three phases, each having a phase before the phase shift processing.

5 Claims, 6 Drawing Sheets

INVERTER APPARATUS

This nonprovisional application is based on Japanese Patent Application No. 2014-155354 filed on Jul. 30, 2014, with the Japan Patent Office, the entire contents of which are hereby incorporated by reference.

BACKGROUND OF THE INVENTION

Field of the Invention

The present disclosure relates to an inverter apparatus, and particularly to an inverter apparatus for driving a three-phase alternating-current (AC) motor.

Description of the Background Art

Conventionally, an electric motor is driven using a PWM (pulse width modulation) control inverter apparatus including a power transistor and an IGBT (Insulated Gate Bipolar Transistor) each for a switching element. In the case where the electric motor is driven using such an inverter apparatus, a surge voltage is generated, so that a motor coil may be damaged or an electric breakdown may occur.

For example, Japanese Patent Laying-Open No. 06-38543 discloses a surge voltage suppression apparatus having a reactor provided on the inverter output side and operating an electric motor by applying an inverter output voltage to the electric motor via a cable having such a length as to form a line reactor in the reactor.

In some inverters, smoothing capacitors may be connected in parallel between an inverter circuit formed by a combination of a plurality of semiconductor elements (switching elements) and a power supply (battery). It is known in this case that the capacitor includes a resistance component referred to as an "equivalent series resistance (ESR)" and resulting from the resistance of an electrode, the characteristics of a dielectric, and the like, wherein this ESR can be negligible at room temperature to elevated temperature, but may be increased to a non-negligible value as the temperature lowers (for example, 0° C. or lower).

Also, when the electric motor is driven using the above-described inverter apparatus, a motor current flows into and out of the capacitor, thereby generating a surge voltage resulting from the ESR. When the surge voltage exceeds a breakdown voltage of the semiconductor element and the like, the semiconductor element may be damaged. Accordingly, in the case where a motor current is supplied to the electric motor by controlling the inverter apparatus including a capacitor at the input side of the inverter circuit when the environmental temperature is relatively low, the influence caused by the ESR of the capacitor should be taken into consideration.

Accordingly, in order to prevent the components of the inverter apparatus from being damaged by a surge voltage generated by the ESR of the capacitor at the time when the environmental temperature is relatively low, conventionally, the maximum value (limitation motor current value) of the motor current that can be supplied to the electric motor at each temperature is produced as a map, and the inverter apparatus is controlled based on this map. Specifically, a warm-up operation of the electric motor is performed while limiting the motor current to thereby raise the temperature of the capacitor, and after that, a normal operation is performed.

However, in the case where the electric motor is used in a more severe low-temperature environment, the motor current that can be supplied to the electric motor is further decreased, thereby lengthening the time period of the warm-up operation of the electric motor. This results in a problem that it takes more time to start-up the electric motor.

SUMMARY OF THE INVENTION

The present disclosure has been made in order to solve the above-described problems. An object in a certain aspect is to provide an inverter apparatus capable of further reducing the time period from the warm-up operation of the electric motor until start-up thereof.

According to a certain embodiment, an inverter apparatus for controlling a three-phase AC motor is provided. The inverter apparatus includes: an inverter circuit configured to supply a current to the three-phase AC motor; a capacitor provided at an input side of the inverter circuit; and a control unit configured to control the inverter circuit by outputting PWM signals of three phases to the inverter circuit. The control unit includes a first control mode and a second control mode each as a control mode for controlling the inverter circuit. The control unit is configured to: in the first control mode, perform phase shift processing for shifting a phase of at least one of PWM signals of three phases output to the inverter circuit in the second control mode such that a time period during which polarities of output voltages of three phases output from the inverter circuit are equal is shorter in the first control mode than the time period in the second control mode; control the inverter circuit so as to supply a direct current to the three-phase AC motor as a d-axis current by outputting the PWM signals of three phases, each having a phase after the phase shift processing; and switch the control mode from the first control mode to the second control mode when a predetermined condition relating to a temperature of the capacitor is satisfied. The control unit is configured to, in the second control mode, control the inverter circuit so as to supply an alternating current to the three-phase AC motor by outputting the PWM signals of three phases, each having a phase before the phase shift processing.

According to another embodiment, an inverter apparatus for controlling a three-phase AC motor is provided. The inverter apparatus includes: an inverter circuit configured to supply a current to the three-phase AC motor; a capacitor provided at an input side of the inverter circuit; and a control unit configured to control the inverter circuit by outputting PWM signals of three-phases to the inverter circuit. The control unit includes a first control mode, a second control mode and a third control mode each as a control mode for controlling the inverter circuit. The control unit is configured to: in the first control mode, perform phase shift processing for shifting a phase of at least one of the PWM signals of three phases output to the inverter circuit in the third control mode such that a time period during which polarities of output voltages of three phases output from the inverter circuit are equal is shorter in the first control mode than the time period in the third control mode; control the inverter circuit so as to supply a direct current to the three-phase AC motor as a d-axis current by outputting the PWM signals of three phases, each having a phase after the phase shift processing; and switch the control mode from the first control mode to the second control mode when a predetermined condition relating to a temperature of the capacitor is satisfied. The control unit is configured to, in the second control mode, control the inverter circuit so as to supply an alternating current to the three-phase AC motor by outputting the PWM signals of three phases, each having a phase after the phase shift processing. The control unit is configured to: in the third control mode, estimate a position of a rotor of the three-phase AC motor based on a voltage or a current applied to three phases of the three-phase AC motor; and perform sensorless control for rotating the rotor based on the estimated position of the rotor and control the inverter circuit by outputting the PWM signals of three phases, each having a phase before the phase shift processing to which the phase after the phase shift processing is returned.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The following describes the present embodiment in detail with reference to figures. It should be noted that the same or corresponding portions in the figures are given the same reference characters and are not described repeatedly.

<Entire Configuration>

Figure 1:
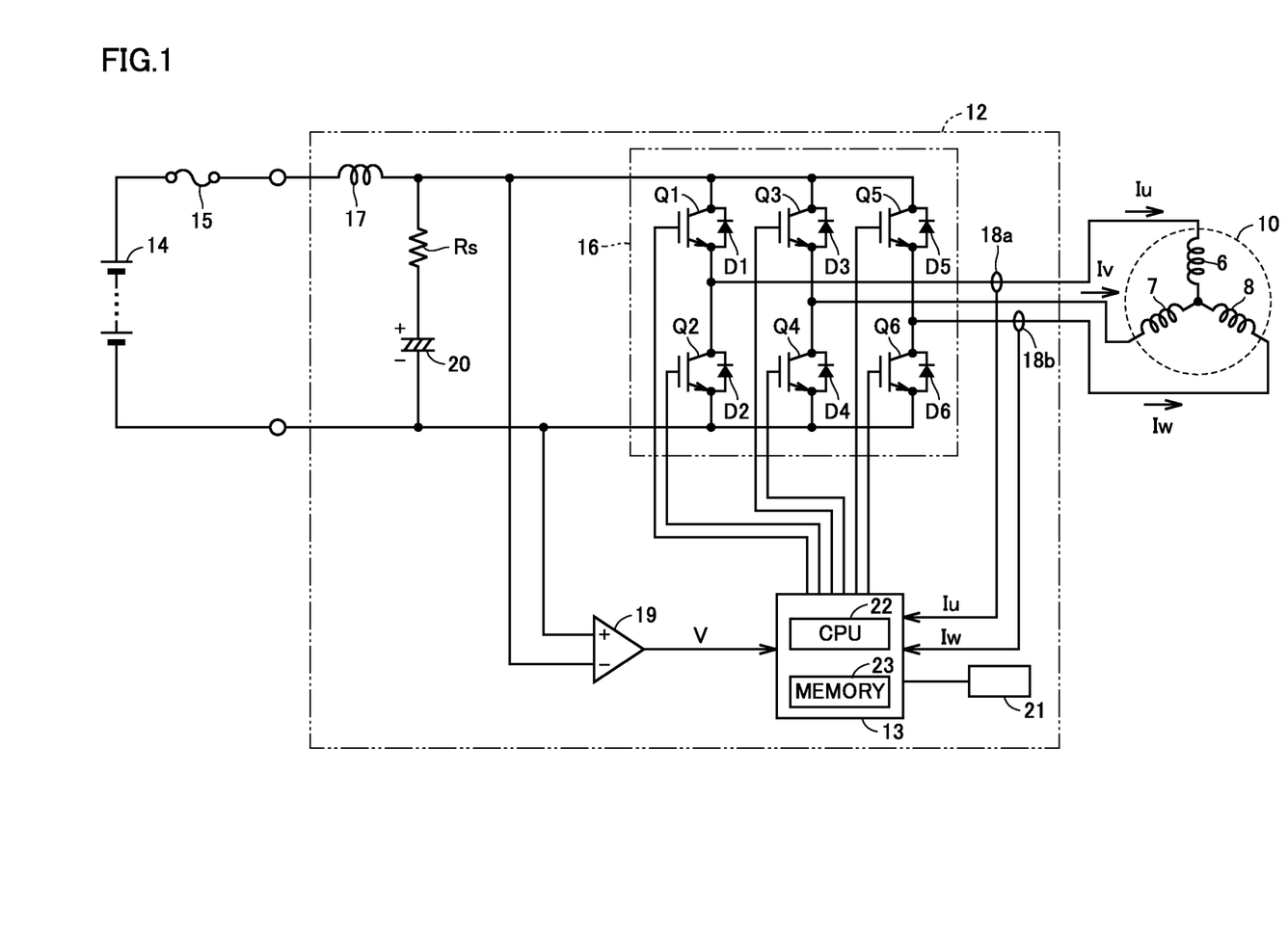
FIG. 1 is a circuit diagram showing the configuration of an inverter apparatus for controlling an electric motor according to the present embodiment.

FIG. 1 is a circuit diagram showing a configuration of an inverter apparatus for controlling an electric motor according to the present embodiment. The electric motor is, for example, an electric motor for an electric compressor. It should be noted that the electric motor may be an electric motor controlled by an inverter and capable of being used in a low-temperature state. For example, the electric motor may be an electric motor used for the vehicle and an electric motor for a machine tool.

Referring to FIG. 1, an inverter apparatus 12 for controlling an alternating-current (AC) motor 10 as the electric motor includes a control unit 13, an inverter circuit 16, a coil 17, current sensors 18a, 18b, a voltage sensor 19, a capacitor 20, and a temperature sensor 21. A resistor Rs connected to a capacitor 20 in series shows an equivalent series resistance (ESR) of the capacitor 20.

The inverter apparatus 12 is connected to a high voltage battery 14 which is a direct-current (DC) power supply via a fuse 15, receives electric power from the high voltage battery 14, and controls driving of the AC motor 10. The AC motor 10 is a three-phase synchronous motor. For example, the AC motor 10 is used as a motor for an air conditioner of a vehicle (a motor for an air conditioner compressor).

A positive electrode terminal of the high voltage battery 14 is connected to one terminal of the capacitor 20 and a positive electrode power line of the inverter circuit 16. A negative electrode terminal of the high voltage battery 14 is connected to the other terminal of the capacitor 20 and a negative electrode power line of the inverter circuit 16. The inverter circuit 16 is supplied with a DC power from the high voltage battery 14 via the capacitor 20. Although not shown, it should be noted that the high voltage battery 14 may be a power source supplying electric power to drive a motor for traveling, which is included in an electric vehicle or a hybrid vehicle.

The inverter circuit 16 includes switching elements Q1 to Q6 and diodes D1 to D6. Examples of the switching elements Q1 to Q6 used herein include an IGBT (Insulated Gate Bipolar Transistor), a MOSFET (metal-oxide-semiconductor field-effect transistor), a bipolar transistor, or the like.

The switching elements Q1, Q2 for U phase are connected in series between the positive electrode power line and the negative electrode power line. The switching elements Q3, Q4 for V phase are connected in series between the positive electrode power line and the negative electrode power line. The switching elements Q5, Q6 for W phase are connected in series between the positive electrode power line and the negative electrode power line. The diodes D1 to D6 are connected in anti-parallel with the switching elements Q1 to Q6, respectively. A U phase coil 6, a V phase coil 7, and a W phase coil 8 corresponding to their respective phases of the AC motor 10 are connected to a connection node of the switching elements Q1, Q2, a connection node of the switching elements Q3, Q4, and a connection node of the switching elements Q5, Q6, respectively. The U phase coil 6, the V phase coil 7, and the W phase coil 8 are Y-connected.

The current sensors 18a, 18b are provided between the inverter apparatus 12 and the AC motor 10. The current sensors 18a, 18b detect current values Iu, Iw of two phase (in the present embodiment, U phase and W phase) currents of current values Iu, Iv, Iw of three phase currents supplied to the AC motor 10. The current sensors 18a, 18b input the detected current values Iu, Iw to the control unit 13. It should be noted that the sum of instantaneous values of the current values Iu, Iv, Iw of three phase currents is zero. Therefore, the current sensors only have to be disposed so as to detect current values of two phase currents. The control unit 13 can also calculate the current value Iv of the remaining one phase current based on the current values Iu, Iw.

Instead of the current sensors 18a, 18b, the current values Iu, Iw may be detected based on the voltage of a shunt resistor connected to each of a switching element for U phase and a switching element for W phase.

The voltage sensor 19 is provided at an input side of the inverter circuit 16. The voltage sensor 19 detects an input voltage value V and inputs the input voltage value V to the control unit 13.

The capacitor 20 is provided at the input side of the inverter circuit 16 and connected parallel with the high voltage battery 14. For example, the capacitor 20 is an electrolytic capacitor. The switching elements Q1, Q3, Q5 are connected to a positive electrode terminal side of the capacitor 20. The switching elements Q2, Q4, Q6 are connected to a negative electrode terminal side of the capacitor 20.

The temperature sensor 21 detects a temperature for estimating a temperature of the capacitor 20 and inputs the detected temperature to the control unit 13. The temperature sensor 21 may be disposed at a position where the temperature sensor 21 can detect the temperature for estimating the temperature of the capacitor 20 and does not have to be near the capacitor 20. In the present embodiment, the temperature sensor 21 is disposed on a substrate on which the switching element is formed. For example, the temperature sensor 21 may be disposed on a surface and the like of a housing for accommodating the inverter apparatus 12.

The control unit 13 includes a CPU (Central Processing Unit) 22 and a memory 23. The control unit 13 controls the inverter circuit 16 by outputting PWM signals of three phases to the inverter circuit 16.

The CPU 22 controls the inverter circuit 16 by reading and executing a program stored in the memory 23. More specifically, the CPU 22 implements each of processes (steps) of the control unit 13 described later by executing the program.

The memory 23 is implemented with a RAM (Random Access Memory), a ROM (Read-Only Memory), and the like. The memory 23 stores programs to be executed by the CPU 22, data to be used by the CPU 22, and the like.

The CPU 22 is connected to a gate as a control terminal of each of the switching elements Q1 to Q6 via a driving circuit (not shown). The CPU 22 is connected to the current sensors 18a, 18b and the voltage sensor 19 via an input interface (not shown).

The CPU 22 outputs a drive waveform signal (PWM signal) to each of the switching elements Q1 to Q6 via the driving circuit based on detection signals of the current sensors 18a, 18b, the voltage sensor 19 and the temperature sensor 21. The PWM signal is used for controlling the AC motor 10 to achieve a target output. By this PWM signal, the operation to turn on/off each of the switching elements Q1 to Q6 of the inverter circuit 16 is controlled. By this control, a direct current from the high voltage battery 14 is converted into a three-phase alternating current and the converted three-phase alternating current is supplied to each of the coils 6, 7, 8 of their respective phases of the AC motor 10. By this three-phase alternating current, the AC motor 10 is driven.

<Function Configuration>

Figure 2:
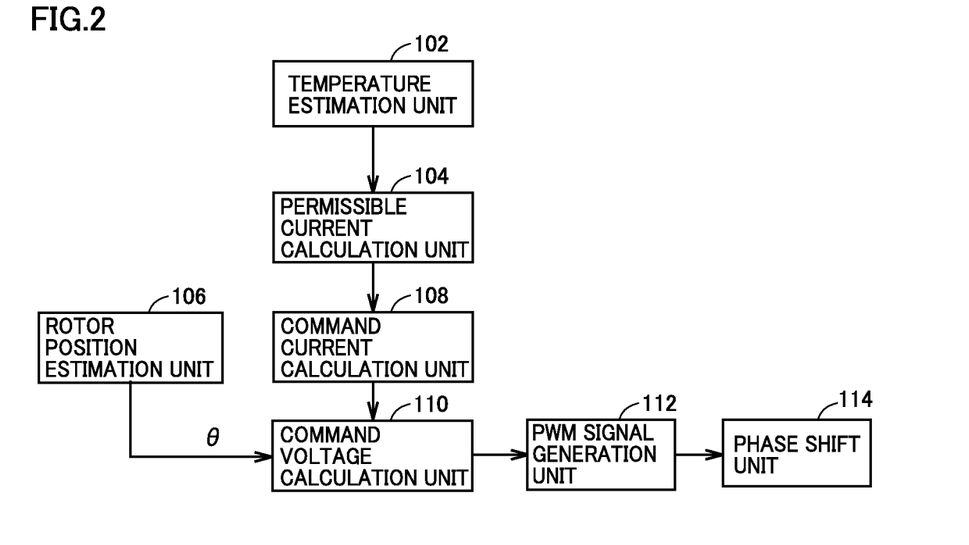
FIG. 2 is a functional block diagram of a control unit.

FIG. 2 is a functional block diagram of the control unit 13. Referring to FIG. 2, as a main function configuration, the control unit 13 includes a temperature estimation unit 102, a permissible current calculation unit 104, a rotor position estimation unit 106, a command current calculation unit 108, a command voltage calculation unit 110, a PWM signal generation unit 112, and a phase shift unit 114. These functions are implemented, for example, mainly by the CPU 22 of the control unit 13 executing the program stored in the memory 23.

In the present embodiment, the control unit 13 has a warm-up control mode for controlling a direct current to be supplied as a d-axis current to the AC motor 10 and a normal control mode for controlling an alternating current to be supplied to the AC motor 10. The control unit 13 switches the control mode from the warm-up control mode to the normal control mode when the predetermined condition related to the temperature of the capacitor is satisfied. In the present embodiment, the predetermined condition is considered as satisfied when the temperature of the capacitor 20 estimated based on the detection signal from the temperature sensor 21 becomes equal to or higher than a prescribed temperature A which will be described later.

The temperature estimation unit 102 estimates the temperature of the capacitor 20 based on the detection signal (detected temperature) from the temperature sensor 21. Specifically, the memory 23 stores the information (for example, a relational expression or a table) showing the relation between the temperature of the position at which the temperature sensor 21 is provided and the temperature of the capacitor 20.

In the present embodiment, since the temperature sensor 21 is disposed on a substrate in which a switching element is formed, the memory 23 stores the relational expression showing the relation between the temperature of this substrate and the temperature of the capacitor 20. This relational expression is produced by performing a simulation in advance or actually operating the AC motor 10. Accordingly, the temperature estimation unit 102 can estimate the temperature of the capacitor 20 based on the temperature detected by the temperature sensor 21 and this relational expression.

The permissible current calculation unit 104 calculates the maximum-permissible motor current value at the temperature estimated by the temperature estimation unit 102 based on the information (for example, a map shown in FIG. 3 described later) showing the relation between the temperature of the capacitor stored in the memory 23 and the maximum-permissible motor current value. It should be noted that the maximum-permissible motor current value is the maximum value of the motor current at which the components of the inverter apparatus 12 are not damaged by the surge voltage caused by an equivalent series resistance Rs of the capacitor 20.

Figure 3:
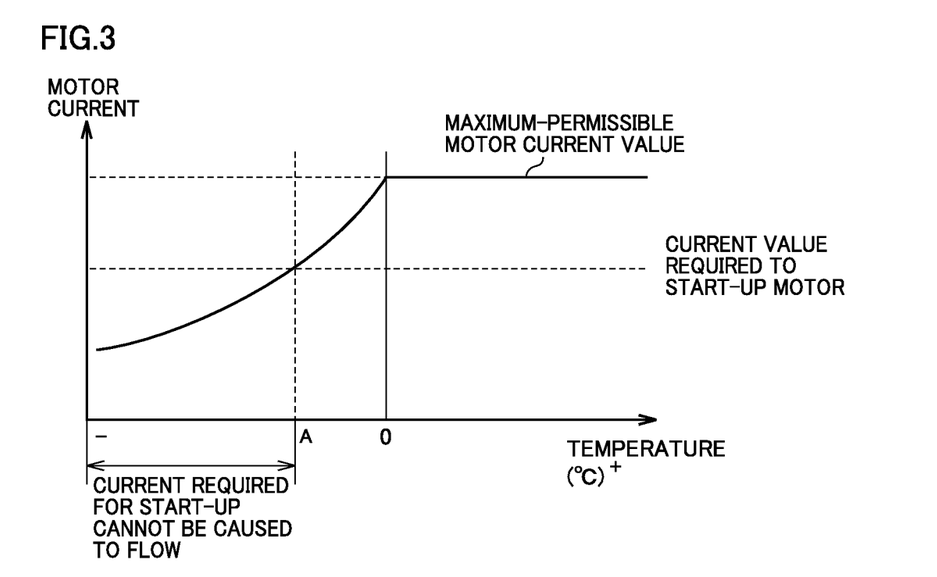
FIG. 3 is a diagram showing the relation between a temperature of a capacitor and a maximum-permissible motor current value.

FIG. 3 is a diagram showing the relation between the temperature of the capacitor and the maximum-permissible motor current value. Referring to FIG. 3, the map shows the relation between the temperature of the capacitor and the maximum-permissible motor current value, and the current value required to generate a torque required to start-up the AC motor 10. It also shows that the maximum-permissible motor current value becomes equal to or higher than a current value required to generate a torque required to start-up the AC motor 10 when the capacitor shows a temperature equal to or higher than the prescribed temperature A.

Again referring to FIG. 2, the rotor position estimation unit 106 estimates the position (a phase θ) and the speed of the rotor based on the output signals from the current sensors 18a, 18b and the voltage sensor 19. Specifically, the rotor position estimation unit 106 calculates a voltage pulse to be applied based on the voltage value detected by the voltage sensor 19, applies the calculated voltage pulse to the U phase, the V phase and the W phase of the AC motor 10, and detects a value of the current flowing through an interconnection of each of the U phase, the V phase, and the W phase by the current sensors 18a and 18b. Then, the rotor position estimation unit 106 estimates a position of the rotor based on the data stored in the memory 23, the current values detected by the current sensors 18a, 18b, and the voltage value detected by the voltage sensor 19. The data stored in the memory 23 is for example a program for estimating the position of the rotor based on the current values detected by the current sensors 18a, 18b and the voltage value detected by the voltage sensor 19.

The command current calculation unit 108 sets a command d-axis current value and a command q-axis current value based on the torque command value of the AC motor 10 and the maximum-permissible motor current value calculated by the permissible current calculation unit 104.

The command voltage calculation unit 110 calculates a detected d-axis current value and a detected q-axis current value each showing a detected value of the current flowing through the AC motor 10 based on the value of the current flowing through each interconnection of the U phase, the V phase and the W phase and detected by the current sensors 18a, 18b, and also on the phase θ calculated by the rotor position estimation unit 106. Then, the command voltage calculation unit 110 calculates a command d-axis voltage value based on the difference between the command d-axis current value and the detected d-axis current value, and also calculates a command q-axis voltage value based on the difference between the command q-axis current value and the detected q-axis current value.

The PWM signal generation unit 112 calculates command voltage values Vu, Vv and Vw for the coils 6, 7, and 8 of three phases of the AC motor 10 based on the command d-axis voltage value and the command q-axis voltage value, and then generates a PWM signal required to obtain the command voltage values Vu, Vv, and Vw.

In the warm-up control mode, the phase shift unit 114 shifts a phase of at least one of the PWM signals of three phases generated by the PWM signal generation unit 112 (phase shift processing), and outputs the PWM signals after the phase shift processing to the inverter circuit 16. The phase shift unit 114 outputs the PWM signals generated by the PWM signal generation unit 112 to the inverter circuit 16 without shifting the phase. By this PWM signal, each of the switching elements Q1 to Q6 of the inverter circuit 16 is driven to be on/off.

Then, positive-phase and negative-phase PWM signals for each of the U phase, the V phase and the W phase are output to the inverter circuit 16 in order to control the AC motor 10. The positive-phase PWM signal and the negative-phase PWM signal are complementary to each other. Basically, when one of these positive-phase and negative-phase PWM signals is at an active level at which the switching elements are turned on, the other of these PWM signals is at an inactive level at which the switching elements are turned off. It should be noted that there may be a dead time at which the positive-phase and negative-phase PWM signals each are at an inactive level.

Accordingly, in the present embodiment, the PWM signal of one phase is represented by a concept including a positive-phase PWM signal and a negative-phase PWM signal. Specifically, the PWM signal of a U phase includes a positive-phase and negative-phase PWM signals that are supplied to the switching elements Q1 and Q2, respectively. Similarly, the PWM signal of a V phase includes positive-phase and negative-phase PWM signals that are supplied to the switching elements Q3 and Q4, respectively. The PWM signal of a W phase includes positive-phase and negative-phase PWM signals that are supplied to the switching elements Q5 and Q6, respectively.

Figure 4A:
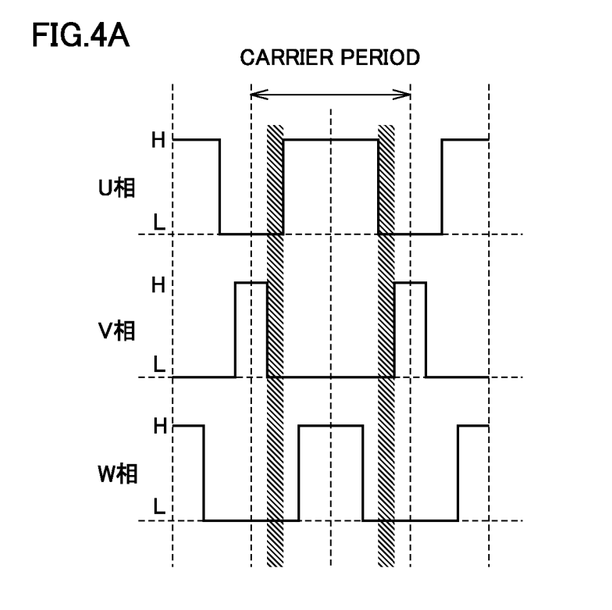
FIGS. 4A and 4B each are a schematic diagram showing an output voltage waveform of an inverter circuit before and after a phase shift.
Figure 4B:
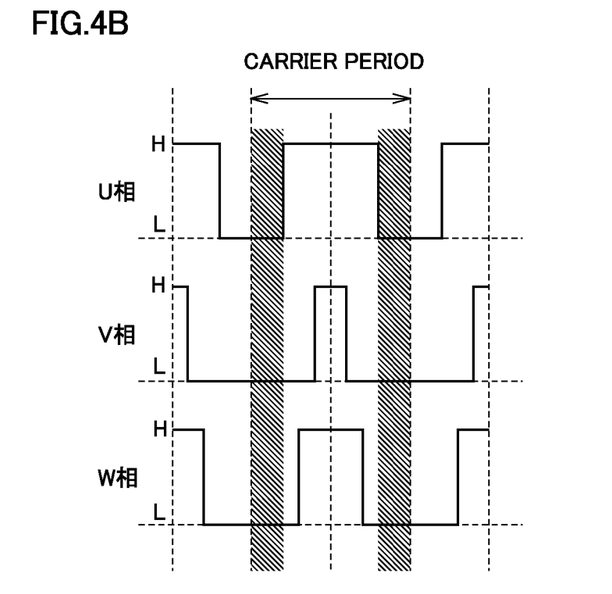

Specifically, in the warm-up control mode, the phase shift unit 114 shifts the phase of at least one of the PWM signals of three phases output to the inverter in the normal control mode such that the time period during which polarities of output voltages of three phases output from the inverter circuit 16 are the same is shorter in the warm-up control mode than that in the normal control mode. Referring to FIGS. 4A and 4B, the phase shift processing will be hereinafter described in detail.

FIGS. 4A and 4B each are a schematic diagram showing an output voltage waveform of the inverter circuit 16 before and after a phase shift. Specifically, FIG. 4A shows an output voltage waveform after a phase shift while FIG. 4B shows an output voltage waveform before a phase shift. In addition, "H" in each of FIGS. 4A and 4B shows that the output voltage is at a high voltage level (High polarity), and "L" shows that the output voltage is at a low voltage level (Low polarity).

The PWM signal, which is a pulse-width controlled square-wave signal, serves to control the output voltage output from the inverter circuit 16. The PWM signals corresponding to the U phase, the V phase and the W phase, respectively, are output to the inverter circuit 16. The PWM signals of three phases have their respective prescribed phases and duty ratios.

As shown in FIGS. 4A and 4B, when comparing the output voltage waveform before a phase shift (FIG. 4B) and the output voltage waveform after a phase shift (FIG. 4A), it turns out that the time of electricity conduction to the AC motor 10 is relatively longer after the phase shift than before the phase shift in one period of the PWM carrier (carrier wave). Specifically, the time period during which a voltage is applied between the UW phases and the V phase and between the U phase and the VW phases is longer after the phase shift than before the phase shift. In other words, the time period during which polarities of the output voltages of three phases (a U phase, a V phase, a W phase) are the same (each phase has a High polarity or a Low polarity) is shorter after the phase shift than before the phase shift (the same polarity time period: the time period indicated by each shaded area in FIGS. 4A and 4B).

Accordingly, when the switching elements Q1 to Q6 are operated to be switched based on the PWM signals after the phase shift, a current flowing into and out of the capacitor 20 is increased as compared with the case before the phase shift. Therefore, the rate of raising the temperature of the capacitor 20 can be increased, with the result that the warm-up operation can be completed earlier.

Furthermore, based on the phases and the duty ratios of the PWM signals of three phases output to the inverter in the normal control mode, the PWM signal generation unit 112 performs phase shift processing such that the same polarity time period in the warm-up control mode is the shortest. For example, in the examples of FIGS. 4A and 4B, the phase of the output voltage of a V phase is shifted (FIG. 4A) by shifting the phase of the PWM signal of a V phase from the state before the phase shift (FIG. 4B) such that the same polarity time period is the shortest. It should be noted that a phase of at least one of the PWM signals of three phases only has to be shifted, which may be such a configuration as that the state after the phase shift in FIG. 4A is implemented by shifting phases of the PWM signals of two phases or three phases from the state before the phase shift in FIG. 4B.

In addition, the rotor position estimation unit 106 is used to thereby allow sensorless control for rotation control of the rotor of the AC motor 10 based on the estimated position and speed of the rotor. Sensorless control is carried out for rotating the motor based on the estimate value obtained by estimating the position and the rotation speed of the rotor from an input voltage, a motor current and the like without using a rotation speed sensor such as a resolver for detecting the rotor position of the motor.

<Processing Procedure>

Figure 5:
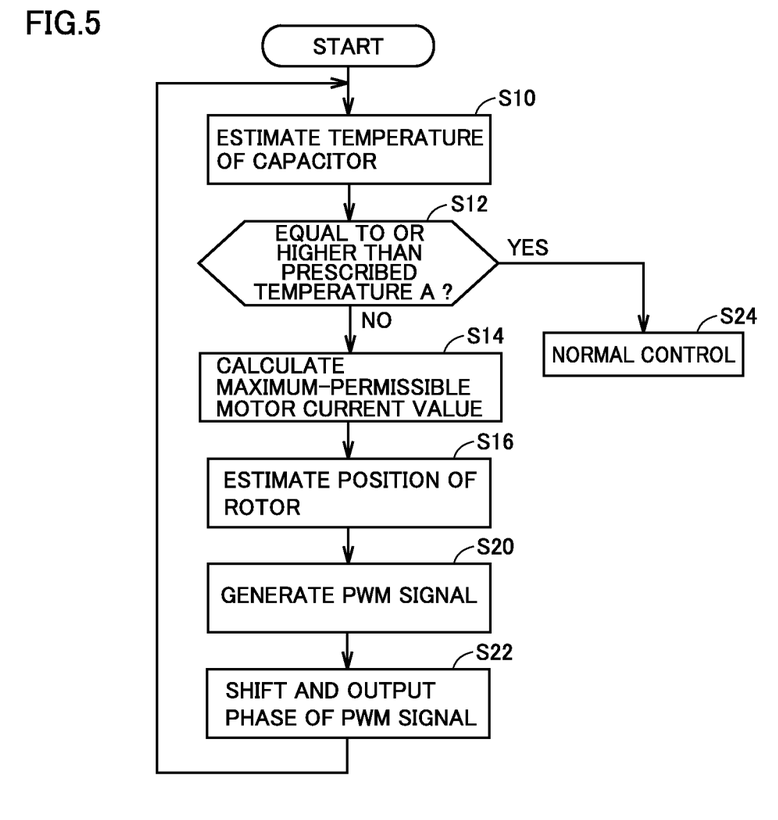
FIG. 5 is a flowchart showing warm-up control processing performed by the control unit.
Figure 6:
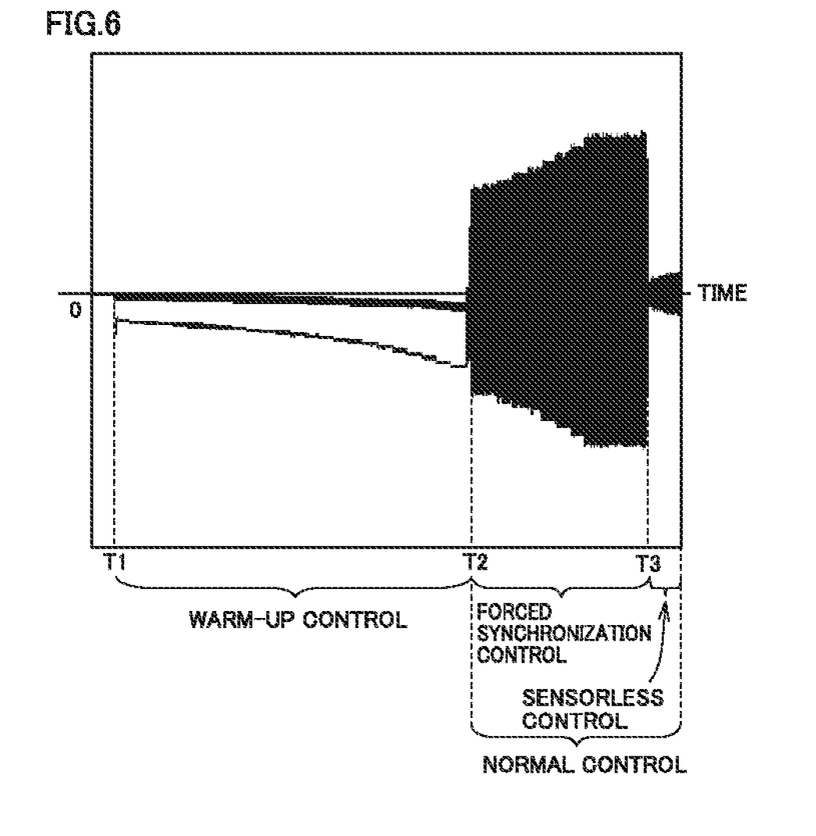
FIG. 6 is a waveform diagram showing two phases (a U phase and a W phase) of current waveforms of an AC motor.

FIG. 5 is a flowchart showing warm-up control processing performed by the control unit 13. FIG. 6 is a waveform diagram showing two phases (a U phase and a W phase) of current waveforms of the AC motor 10. FIG. 6 shows that the control unit 13 performs control in the warm-up control mode from time T1 to time T2, and then, performs control in the normal control mode at and after time T2. The normal control mode is further divided into a forced synchronization control mode (from time T2 to time T3) and a sensorless control mode (at and after time T3).

When the inverter apparatus 12 is started, the CPU 22 of the control unit 13 estimates the temperature of the capacitor 20 based on the detection signal input from the temperature sensor 21 (step S10). Then, the CPU 22 determines whether the estimated temperature of the capacitor 20 (the estimation temperature of the capacitor 20) is equal to or higher than the prescribed temperature A (step S12). As shown in FIG. 3, the prescribed temperature A corresponds to a current value at which a torque required to start-up the AC motor 10 can be generated. In other words, the CPU 22 determines whether or not the maximum-permissible motor current value at the estimated temperature of the capacitor 20 is less than a value at which a torque required to start-up the AC motor 10 can be generated.

Again referring to FIG. 5, when the estimated temperature of the capacitor 20 is equal to or higher than the prescribed temperature A (YES in step S12), the CPU 22 performs control in the normal control mode in which an alternating current is supplied to the AC motor 10 for driving the AC motor 10 (step S24).

Specifically, the CPU 22 outputs the PWM signals of three phases to control the inverter circuit 16 and adjust the current value supplied to the AC motor 10, such that the AC motor 10 achieves a target speed and a target torque while the d-axis current and the q-axis current each are set at a value equal to or less than the maximum-permissible motor current value. Accordingly, the rotor of the AC motor 10 starts to rotate. In this case, the current waveform in the normal control mode corresponds to the current waveform at and after T2 shown in FIG. 6, and thus, it turns out that the alternating current is supplied to the AC motor 10.

On the other hand, when the estimated temperature of the capacitor 20 is less than the prescribed temperature A (NO in step S12), the CPU 22 carries out the process from step S14, to carry out control in the warm-up control mode in which a direct current is supplied as a d-axis current. In this case, the current waveform in the warm-up control mode corresponds to the current waveform from T1 to T2 shown in FIG. 6, and thus, it turns out that a direct current is supplied to the AC motor 10.

Then, the CPU 22 calculates the maximum-permissible motor current value at the estimated temperature of the capacitor 20 based on the map shown in FIG. 3 stored in the memory 23 (step S14). Then, the CPU 22 estimates the position (a phase θ) of the rotor based on the detection signals of the current sensors 18a, 18b and the voltage sensor 19 (step S16).

Then, the CPU 22 determines the command d-axis voltage value and the command q-axis voltage value based on the detection signals of the current sensors 18a, 18b and the phase θ, and then, generates PWM signals of three phases such that the d-axis motor current value and the q-axis motor current value attain a command d-axis current value (the maximum-permissible motor current value) and a command q-axis current value (0 A), respectively (step S20). Since the CPU 22 controls the command q-axis current value to be set at 0 A in the warm-up control mode, the command d-axis current value is the maximum-permissible motor current value. Accordingly, a direct current of the maximum-permissible motor current value flows through the AC motor 10, and this direct current is caused to flow into and out of the capacitor 20 by the switching operation of switching elements Q1 to Q6. The temperature of the capacitor 20 rises when the direct current flows into and out of the capacitor 20.

Then, the CPU 22 shifts a phase of at least one of the generated PWM signals of three phases, and outputs the PWM signals after the phase shift processing to the inverter circuit 16 (step S22). Specifically, the CPU 22 shifts a phase of at least one of the PWM signals of three phases output to the inverter circuit 16 in the normal control mode such that a time period during which polarities of output voltages of three phases output from the inverter circuit 16 are the same is shorter than that in the normal control mode. Then, the CPU 22 outputs the shifted phase to the inverter circuit 16.

Then, the CPU 22 repeats the process from step S10 to step S22 until the estimated temperature of the capacitor 20 attains a temperature equal to or higher than the prescribed temperature A. Then, when the estimated temperature of the capacitor 20 becomes equal to or higher than the prescribed temperature A (YES in step S12), the CPU 22 ends the warm-up control mode and proceeds (switches the mode) to the normal control mode. Specifically, the CPU 22 controls the inverter circuit 16 so as to supply an alternating current to the three-phase AC motor by outputting the PWM signals of three phases without performing the above-described phase shift processing. In other words, these PWM signals of three phases each have a phase before the phase shift processing as described above.

Effects of the Embodiment

According to the present embodiment, by shifting a phase in the warm-up control mode, the time of electricity conduction to the AC motor is lengthened more in this warm-up control mode than in the case where a phase is not shifted. Thereby, the ripple amount of the input current or the motor current is increased, so that the current input into/output out of the capacitor can be increased. Accordingly, the temperature of the capacitor can be raised more speedily, with the result that the warm-up operation can be completed earlier. On the other hand, the ripple amount of the input current or the motor current is less in the normal control mode than in the warm-up control mode. Thereby, deterioration of motor control and efficiency can be prevented.

Furthermore, according to the present embodiment, the inverter circuit is controlled such that the current equal to or lower than the maximum-permissible motor current value flows into the AC motor. Accordingly, the components of the inverter apparatus can be prevented from being damaged by the surge voltage caused by the ESR of the capacitor at a relatively low temperature.

<Modification>

(Switching of Control Mode)

In the above-described embodiment, an explanation has been given with regard to the configuration in which the temperature of the capacitor 20 is estimated based on the detection signal by the temperature sensor 21, and the control mode is shifted from the warm-up control mode to the normal control mode when the estimated temperature reaches the prescribed temperature A, but the present embodiment is not limited to this configuration.

For example, since the current flowing through the capacitor 20 is increased in accordance with the elapsed time from start of the warm-up control mode, the temperature of the capacitor 20 rises. Accordingly, the control unit 13 may be configured to measure the elapsed time from start of the warm-up control mode using a timer (not shown) or the like, and then shift the control mode from the warm-up control mode to the normal control mode when the measured time becomes equal to or longer than the predetermined time. The predetermined time means a time period from start of the warm-up control mode until the temperature of the capacitor 20 reaches the prescribed temperature A.

In this case, the memory 23 stores a relational expression (or a table) showing the relation between the elapsed time from start of the warm-up control mode and the temperature of the capacitor 20. This relational expression is produced by performing a simulation in advance or actually operating the AC motor 10. The control unit 13 can estimate the temperature of the capacitor 20 based on the elapsed time and the relational expression. Then, in the case where the measured elapsed time is equal to or longer than the elapsed time during which the temperature of the capacitor 20 reaches the prescribed temperature A, the control unit 13 shifts the control mode from the warm-up control mode to the normal control mode.

(Phase Shift)

Furthermore, in the above-described embodiment, an explanation has been given with regard to the configuration in which the phase shift processing is carried out only in the warm-up control mode, but the embodiment is not limited to this configuration. For example, the control unit 13 may be configured to output PWM signals of three phases after the phase shift processing during a time period from start of warm-up control until start of sensorless control (from T1 to T3 in FIG. 6).

Specifically, referring to FIG. 6, the phase shift processing is carried out in the warm-up control mode (from T1 to T2 in FIG. 6) and in the forced synchronization control mode (from T2 to T3 in FIG. 6), but not carried out in the sensorless control mode (at and after T3 in FIG. 6). The forced synchronization control mode is for forcibly increasing the speed of the rotor at a prescribed acceleration during a time period from when the rotor starts to rotate until the rotor achieves a speed at which excellent accuracy of phase calculation is achieved.

In this case, the control unit 13 performs phase shift processing for shifting a phase of at least one of PWM signals of three phases output to the inverter in the sensorless control mode such that a time period during which polarities of output voltages of three phases output from the inverter circuit 16 are the same is shorter in the warm-up control mode than that in the sensorless control mode. Then, the control unit 13 controls the inverter circuit 16 to supply a direct current to the three-phase AC motor as a d-axis current by outputting the PWM signals of three phases each having a phase after the phase shift processing.

Furthermore, in the forced synchronization control mode, the control unit 13 controls the inverter circuit 16 so as to supply an alternating current to the three-phase AC motor by outputting the PWM signals of three phases each having a phase after the phase shift processing, while forcibly raising the speed of the rotor at the prescribed acceleration.

Then, in the sensorless control mode, the control unit 13 estimates the position of the rotor of the AC motor 10 based on the voltage or the current applied to the three phases of the AC motor 10, and performs sensorless control for rotating the rotor based on the estimated position of the rotor and controls the inverter circuit 16 by outputting the PWM signals of three phases each having a phase before the phase shift processing. In addition, the control mode is shifted from the forced synchronization control mode to the sensorless control mode at the time when the speed of the rotor becomes equal to or higher than the prescribed speed.

Other Embodiments

Although the configuration for performing sensorless control has been described in the above embodiment, the embodiment is not limited to this configuration. The position of the rotor of the motor may be detected by using a rotation speed sensor such as a resolver provided in the inverter apparatus 12 without estimating the position of the rotor based on the current values detected by the current sensors 18a, 18b and the voltage value detected by the voltage sensor 19.

The configuration illustrated as an embodiment described above, which is merely an example of the configuration of the present invention, can be combined with another known technique or can also be configured by modification such as partial omission within a scope not deviating from the feature of the present invention.

Also in the above-described embodiment, an appropriate combination of the configurations described in the modification example may be employed for implementation.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An inverter apparatus for controlling a three-phase alternating-current (AC) motor, the inverter apparatus comprising:
   an inverter circuit configured to supply a current to the three-phase AC motor;
   a capacitor provided at an input side of the inverter circuit; and
   a control unit configured to determine a command d-axis voltage value and a command q-axis voltage value, generate PWM signals of three phases based on the command d-axis voltage value and the command q-axis voltage value, and control the inverter circuit by outputting the PWM signals of three phases to the inverter circuit,
   the control unit including a first control mode and a second control mode each as a control mode for controlling the inverter circuit, wherein
   the control unit is configured to: in the first control mode, generate first PWM signals of three phases such that a command q-axis current value is set at 0 A, based on the determined command d-axis voltage value and the determined command q-axis voltage value;
   the control unit is configured to, in the second control mode, generate second PWM signals of three phases such that a command q-axis current value is set at a value other than 0 A, based on the determined command d-axis voltage value and the determined command q-axis voltage value;
   the control unit is configured to: in the first control mode, perform phase shift processing for shifting a phase of at least one of the first PWM signals of three phases such that a time period during which polarities of output voltages of three phases output from the inverter circuit are equal is shorter in the first control mode than said time period in the second control mode;
   control the inverter circuit by outputting the first PWM signals of three phases, each having a phase after the phase shift processing;
   switch the control mode from the first control mode to the second control mode when a predetermined condition relating to a temperature of the capacitor is satisfied; and
   the control unit is configured to, in the second control mode, control the inverter circuit by outputting the second PWM signals of three phases.

2. The inverter apparatus according to claim 1, further comprising a temperature sensor configured to detect a temperature for estimating the temperature of the capacitor, wherein
the control unit is configured to:
estimate the temperature of the capacitor based on the detected temperature;
determine that the predetermined condition is satisfied when the estimated temperature becomes equal to or higher than a predetermined temperature; and
switch the control mode from the first control mode to the second control mode.

3. The inverter apparatus according to claim 1, wherein the control unit is configured to:
measure an elapsed time from start of control of the inverter circuit in the first control mode;
determine that the predetermined condition is satisfied when the measured elapsed time becomes equal to or longer than a predetermined time; and
switch the control mode from the first control mode to the second control mode.

4. The inverter apparatus according to claim 1, wherein the control unit is configured to perform the phase shift processing such that the time period in the first control mode is shortest, based on phases and duty ratios of the PWM signals of three phases output to the inverter circuit in the second control mode.

5. An inverter apparatus for controlling a three-phase AC motor, the inverter apparatus comprising:
an inverter circuit configured to supply a current to the three-phase AC motor;
a capacitor provided at an input side of the inverter circuit; and
a control unit configured to determine a command d-axis voltage value and a command q-axis voltage value, generate PWM signals of three phases based on the command d-axis voltage value and the command q-axis voltage value, and control the inverter circuit by outputting the PWM signals of three-phases to the inverter circuit, wherein
the control unit includes a first control mode, a second control mode and a third control mode each as a control mode for controlling the inverter circuit,
the control unit is configured to, in the first control mode, generate first PWM signals of three phases such that a command q-axis current value is set at 0 A, based on the determined command d-axis voltage value and the determined command q-axis voltage value, and
the control unit is configured to: in the second control mode and the third control mode, generate second PWM signals of three phases such that a command q-axis current value is set at a value other than 0 A, based on the determined command d-axis voltage value and the determined command q-axis voltage value,
the control unit is configured to: in the first control mode,
perform phase shift processing for shifting a phase of at least one of the first PWM signals of three phases such that a time period during which polarities of output voltages of three phases output from the inverter circuit are equal is shorter in the first control mode than said time period in the third control mode;
control the inverter circuit by outputting the first PWM signals of three phases, each having a phase after the phase shift processing; and
switch the control mode from the first control mode to the second control mode when a predetermined condition relating to a temperature of the capacitor is satisfied,
the control unit is configured to, in the second control mode,
perform phase shift processing for shifting a phase of at least one of the second PWM signals of three phases such that a time period during which polarities of output voltages of three bases output from the inverter circuit are equal is shorter in the second control mode than said time period in the third control mode,
control the inverter circuit by outputting the second PWM signals of three phases, each having a phase after the phase shift processing, and
the control unit is configured to: in the third control mode,
estimate a position of a rotor of the three-phase AC motor based on a voltage or a current applied to three phases of the three-phase AC motor;
perform sensorless control for rotating the rotor based on the estimated position of the rotor;
return a phase of the second PWM signals of three phases after the phase shift processing in the second control mode to a phase before the phase shift processing; and
control the inverter circuit by outputting the second PWM signals of three phases, each having the returned phase.

* * * * *